(No Model.)  3 Sheets—Sheet 2.
G. G. FRYER.
FILTERING APPARATUS.
No. 606,453.  Patented June 28, 1898.
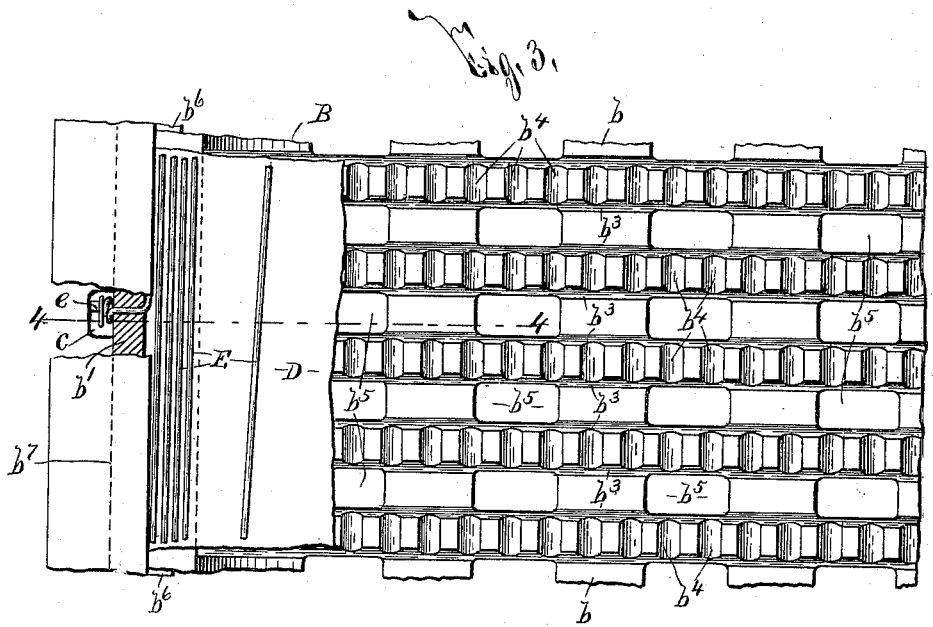
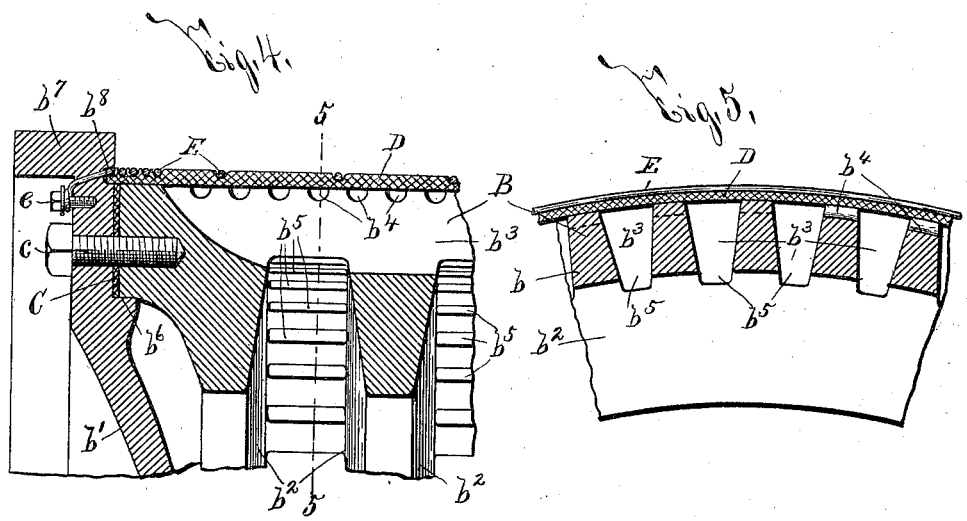
WITNESSES:
INVENTOR
George G. Fryer
BY
ATTORNEYS.

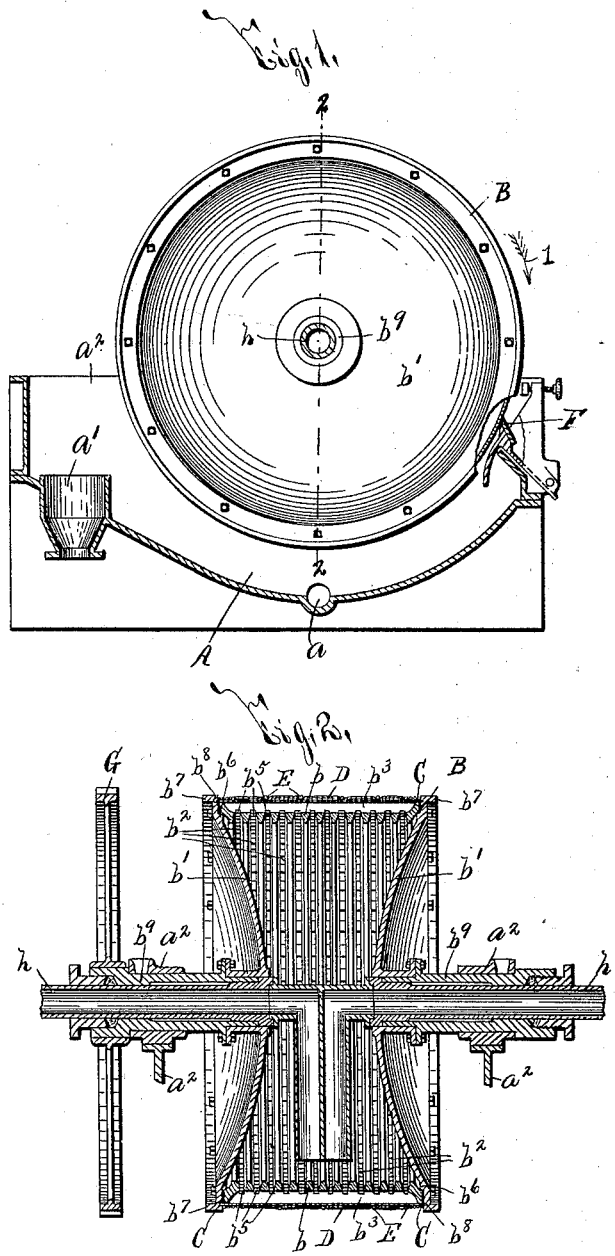

(No Model.)  3 Sheets—Sheet 3.
G. G. FRYER.
FILTERING APPARATUS.
No. 606,453. Patented June 28, 1898.
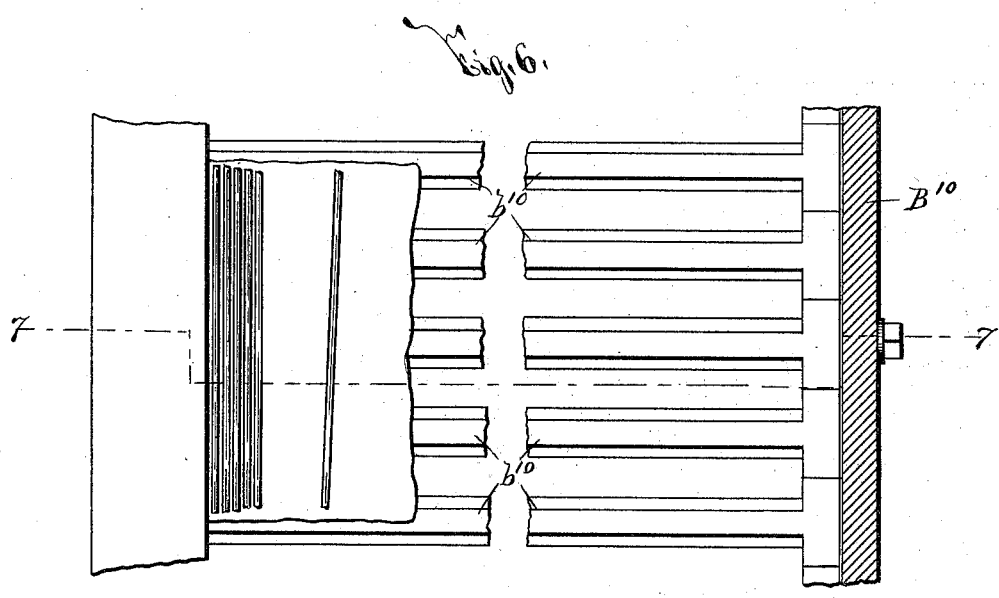
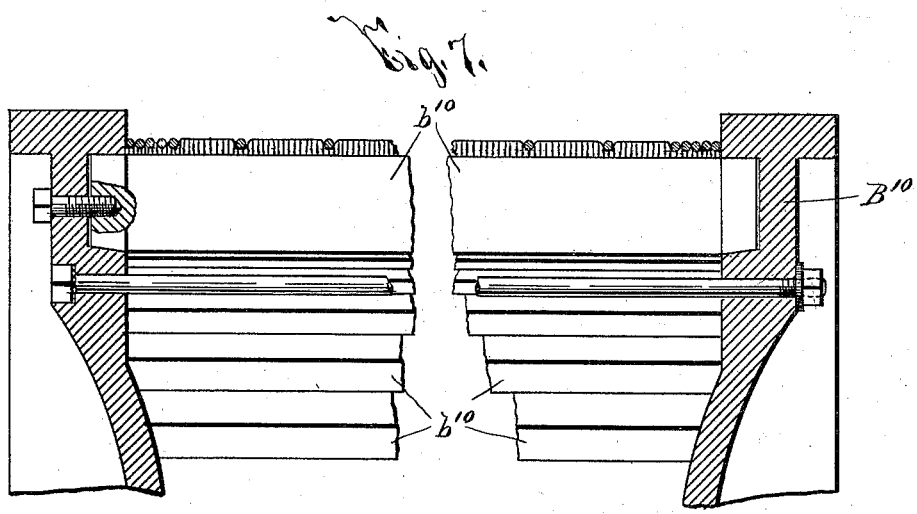
WITNESSES:
INVENTOR
George G. Fryer
BY
Hey & Parsons
ATTORNEYS,

# UNITED STATES PATENT OFFICE.

GEORGE G. FRYER, OF SYRACUSE, NEW YORK, ASSIGNOR TO THE SOLVAY PROCESS COMPANY, OF SAME PLACE.

FILTERING APPARATUS.

SPECIFICATION forming part of Letters Patent No. 606,453, dated June 28, 1898.

Application filed March 2, 1897. Serial No. 625,736. (No model.)

*To all whom it may concern:*

Be it known that I, GEORGE G. FRYER, of Syracuse, in the county of Onondaga, in the State of New York, have invented new and useful Improvements in Filtering Apparatus, of which the following, taken in connection with the accompanying drawings, is a full, clear, and exact description.

My invention relates to improvements in filtering apparatus, and has for its object the production of a device which possesses a maximum amount of filtering-surface and is particularly efficient and strong in use; and to this end it consists, essentially, in the combination, construction, and arrangement of the component parts of a filtering apparatus, all as hereinafter more particularly described, and pointed out in the claims.

In describing this invention reference is had to the accompanying drawings, forming a part of this specification, in which like letters indicate corresponding parts in all the views.

Figure 1 is an elevation, partly in section, of my improved filtering apparatus. Fig. 2 is a vertical section taken on line 2 2, Fig. 1. Fig. 3 is an enlarged face view of a portion of the filtering-body of my improved apparatus, the greater part of the perforated facing for said portion of the filtering-body being broken away in order to illustrate the underlying surface. Figs. 4 and 5 are enlarged vertical sections taken, respectively, on lines 4 4 and 5 5, Figs. 3 and 4. Fig. 6 is a face view of a portion of a modified construction of a filtering-body for my improved apparatus; and Fig. 7 is a vertical section taken on line 7 7, Fig. 6.

My improved filtering apparatus preferably comprises means for supplying the material to be filtered and a suitable movable filtering-body. The means for supplying the material to be filtered usually consists of a receptacle A, which may be provided with an inlet-opening $a$ and an overflow-opening $a'$. The filtering-body B is usually cylindrical, is revoluble on a substantially horizontal axis, and is provided with a perforated peripheral filtering-surface which projects into the receptacle A and is movable into engagement with the material in said receptacle. It is obvious, however, that the material to be filtered may be discharged directly upon the periphery or other filtering-surface of the body B by a suitable feed-pipe not necessary to herein illustrate and describe.

The filtering-body B usually consists of a perforated tubular or peripheral wall $b$ and end walls $b'$ $b'$, secured to the opposite extremities of said tubular or peripheral wall. The inner face of the wall $b$ is formed with annular grooves $b^2$, which open from the inner chamber of the body B, and the periphery or outer face of the greater portion of said wall is provided with intersecting grooves $b^3$ $b^4$ and forms the perforated filtering-surface of the body B. The grooves $b^3$ extend substantially parallel with the axis of the body B and crosswise of the grooves $b^2$, and said grooves $b^3$ are of considerable depth, and each communicates at intervals with the grooves $b^2$ for forming perforations $b^5$, extending through the wall $b$ and communicating with the inner chamber of the body B. The grooves $b^4$ extend annularly around the periphery or outer face of the wall $b$ and are formed of less depth than the grooves $b^3$. The tubular or peripheral wall $b$ is preferably formed of cast metal, and, as is obvious to one skilled in the art, the grooves $b^2$ in its inner face may be formed when casting said wall, and the grooves $b^3$ $b^4$ in its periphery or outer face may be cut by suitable milling and turning tools. A tubular or peripheral wall of this construction is manufactured at a minimum expense, is provided with a large amount of external surface, and is very strong and durable, owing to the presence of the annular ribs on its interior interposed between the grooves $b^2$. It is obvious, however, that said tubular or peripheral wall may be otherwise constructed, and at Figs. 6 and 7 I have shown a portion of a filtering-body $B^{10}$, having its tubular or peripheral wall composed of a series of transverse segments $b^{10}$, formed with grooves in their longitudinal edges.

The end walls $b'$ $b'$ of the filtering-body B are usually formed separable from the tubular wall $b$ and are provided with annular shoulders $b^6$, engaged with the inner faces of the opposite extremities of said tubular wall. Suitable gaskets or packing-rings C are interposed between the end faces of the tubular wall $b$ and the end walls $b'$, and screws or other clamping means $c$ are engaged with said tubular and end walls $b$ $b'$ for firmly securing the same together. The outer or peripheral portions of the end walls $b'$ project beyond the periphery or outer face of the tubular wall $b$ and form annular flanges $b^7$, which are arranged at opposite sides of the perforated filtering-surface of the body B and are formed with suitable annular grooves $b^8$ of greater diameter than said filtering-surface.

A suitable facing D is preferably arranged upon the filtering-surface of the body B and is formed with perforations of less size than the perforations $b^5$ in said filtering-surface. This facing usually consists of a ring or endless band of woven material, as flannel, which may be held in position by any suitable means. The opposite or side portions of the facing D are usually extended beyond the outermost grooves $b^4$, the ends of the grooves $b^3$, and the side edges of the filtering-surface of the body B and the tubular wall $b$, and are arranged in the grooves $b^8$, formed in the adjacent faces of the flanges $b^7$. The means for securing the facing D in position preferably consists of a retaining-band E, which is embedded in the facing D and is usually formed of less thickness than the facing, so that its outer face is substantially coincident with the outer face of said facing. The band E is generally formed of wire, is wound spirally around the facing D, extends substantially crosswise of the grooves $b^3$ in the tubular wall $b$, and is supported by portions of the periphery or outer face of said wall $b$, arranged between the annular grooves $b^4$. The opposite ends of the band E are engaged with the side portions of the facing D at opposite sides of the filtering-surface of the body B, are passed through perforations extending through the end walls $b'$ and opening from the grooves $b^8$, and are secured by screws or other fastening means $e$ to the outer faces of said end walls. The convolutions of said band E, which surround the intermediate or substantially central portion of the facing D, are preferably separated a greater distance than the convolutions of said band surrounding the end portions of said facing. The filtered material is removed from the facing D by any suitable means, as a knife F, Fig. 1, extending crosswise of said facing.

The filtering-body B is suitably supported and revolved and is connected to any desirable means for maintaining a partial vacuum within said filtering-body. As here illustrated, the end walls $b'$ $b'$ are provided with hollow projecting trunnions $b^9$, which are journaled in bearings mounted upon the opposite sides $a^2$ of the receptacle A. A gear G is usually fixed to one of said trunnions for revolving the filtering-body B; but any other suitable power-transmitting mechanism may be utilized for this purpose. The means for maintaining a partial vacuum within the body B generally consists of pipes or conduits $h$, passed through the hollow trunnions $b^9$ and provided with downturned ends having their extremities formed with suitable openings and arranged in close proximity to the inner face of the body B. The outer ends of the conduits $h$ are connected to a suitable vacuum-pump or similar device not necessary to herein illustrate and describe.

In the operation of my improved filtering apparatus the body B is revolved in the direction indicated by arrow 1, Fig. 1, and a partial vacuum is maintained within said body. The filtering-surface or periphery of the body B engages the material to be filtered, and, owing to the partial vacuum within the body B, the moisture contained in the material engaged with said filtering-surface is forced through the facing D and the grooves and perforations $b^2$ $b^3$ $b^4$ $b^5$ of the wall $b$, and said material is retained in position upon the facing D. As the filtering-body continues its revolution the material engaged with its filtering-surface is elevated above the material within the receptacle A, whereupon the air or any other drying fluid, as suitable gas, surrounding the upper portion of the filtering-body B is forced inwardly through said material, the facing D, and the tubular wall $b$, and escapes through the pipes or conduits $h$. Said material is therefore both filtered and dried, and when sufficiently treated is removed from the facing D by the knife F.

The operation of my improved apparatus will now be readily understood from the foregoing description and the accompanying drawings, and it will be apparent that the exact construction and arrangement of said apparatus may be considerably varied without departing from the spirit of my invention.

Having thus fully described my invention, what I claim as new, and desire to secure by Letters Patent, is—

1. The combination of a cylindrical filtering-body having a perforated peripheral filtering-surface, a facing consisting of an endless band encircling the filtering-surface and having its side portions extended beyond the side edges of said surface, said facing being formed with perforations of less size than the perforations of the filtering-surface, and a retaining-band wound spirally around the facing and engaged with the side portions of the facing at opposite sides of the filtering-surface for securing the facing in position, substantially as and for the purpose described.

2. The combination of a cylindrical filtering-body having a perforated peripheral filtering-surface, a facing consisting of a perforated band encircling the peripheral surface, and a retaining-band for holding the facing in position, said retaining-band being embedded into the facing and having its outer face substantially coincident with the outer face of the facing, substantially as and for the purpose specified.

3. The combination of a cylindrical filtering-body having its periphery perforated, a perforated facing encircling said periphery, and a retaining-band wound spirally around the facing and having its convolutions surrounding the intermediate or substantially central portion of the facing separated a greater distance than its convolutions surrounding the side portions of said facing, said band being embedded in the facing, substantially as and for the purpose described.

4. The combination of a cylindrical filtering-body having a filtering-surface and flanges projecting from the filtering-body at opposite sides of said surface, the adjacent faces of the flanges being provided with annular grooves formed of greater diameter than the filtering-surface, a perforated facing encircling the filtering-surface and having its side portions extended beyond said filtering-surface and inserted into the annular grooves, and a retaining-band engaged with the portion of the facing interposed between said flanges, substantially as and for the purpose specified.

5. The combination of a cylindrical filtering-body having a filtering-surface and flanges projecting from the filtering-body at opposite sides of said surface and formed with annular grooves in their adjacent faces, a facing consisting of a perforated band encircling the filtering-surface and having its side portions inserted into the annular grooves, and a retaining-band wound spirally around the portion of the facing interposed between the flanges, said retaining-band being embedded into the facing, substantially as and for the purpose set forth.

6. The combination of a cylindrical filtering-body consisting of a tubular wall and opposite end walls detachably secured to the extremities of the tubular wall, a facing consisting of a perforated band encircling the tubular wall, and a retaining-band wound spirally around the facing and having its opposite ends secured to said end walls, substantially as and for the purpose described.

7. The combination of a revoluble filtering-body consisting of a tubular wall and opposite end walls secured to the extremities of the tubular wall and having their adjacent faces formed with annular grooves, a perforated facing encircling the tubular wall and having its side edges inserted into the annular grooves, and a retaining-band wound spirally around the facing and having its ends secured to said end walls, substantially as and for the purpose specified.

8. The combination of a movable filtering-body consisting of a perforated tubular wall, and opposite end walls, one of which end walls is formed with a perforation extending therethrough, a perforated facing encircling the tubular wall, and a retaining-band wound spirally around the facing and having one of its ends passed through the perforation in said one of the end walls, substantially as and for the purpose specified.

9. The combination of a movable filtering-body consisting of a perforated tubular wall, and opposite end walls having their adjacent faces formed with annular grooves, said end walls being also formed with perforations extending therethrough from the annular grooves, a perforated facing encircling the tubular wall and having its side portions inserted into the annular grooves, and a retaining-band wound spirally around the facing and having its opposite ends passed through the perforations in the end walls, substantially as and for the purpose set forth.

10. The combination of a revoluble filtering-body consisting of a perforated tubular wall, opposite end walls having their adjacent faces formed with annular shoulders engaged with the inner faces of the opposite extremities of the tubular wall, gaskets or packing-rings interposed between the end faces of the tubular wall and the adjacent faces of the end walls, clamping means for securing together said tubular and end walls, a perforated facing surrounding the tubular wall, and a retaining-band wound around the facing and secured to the end walls, substantially as and for the purpose specified.

11. The combination of a cylindrical filtering-body having its periphery provided with grooves extending substantially parallel with the axis of the body, a facing consisting of a perforated band encircling said periphery, and a retaining-band wound spirally around the facing and extending substantially crosswise of the grooves, substantially as and for the purpose described.

12. The combination of a cylindrical filtering-body having its periphery provided with grooves arranged substantially parallel with the axis of said body and extending inwardly from said periphery and each communicating at intervals with the inner chamber of the filtering-body, a facing consisting of a perforated band encircling the periphery of the filtering-body and extending beyond the ends of the grooves, and a retaining-band extending substantially crosswise of the grooves for securing the facing in position, substantially as and for the purpose specified.

13. The combination of a cylindrical filtering-body having its periphery provided with annular grooves, a facing consisting of a perforated band encircling the periphery of the filtering-body for covering the annular grooves, and a retaining-band for securing the facing in position, said retaining-band being supported by portions of the periphery of the filtering-body arranged between the annular grooves, substantially as and for the purpose set forth.

14. The combination of a cylindrical body having the inner face of its peripheral wall provided with grooves and the periphery of said wall formed with grooves extending substantially crosswise of the first grooves and communicating at intervals with the first grooves, a facing consisting of a perforated band encircling the periphery of the filtering-wall for covering the grooves in said periphery, and a retaining-band for securing the facing in position, said retaining-band being embedded in the facing, substantially as and for the purpose described.

15. The combination of a cylindrical filtering-body having its peripheral wall provided with grooves arranged substantially parallel with the axis of the filtering-body and extending inwardly from said periphery and each communicating at intervals with the inner chamber of the filtering-body, said periphery being also provided with annular grooves intersecting the first grooves and formed of less depth than the first grooves, and a facing consisting of a perforated band encircling the periphery of said peripheral wall for covering said grooves and having its side portions extended beyond the ends of the first grooves and the outermost annular grooves, substantially as and for the purpose specified.

16. The combination of a cylindrical body having the inner face of its peripheral wall provided with grooves and the periphery of said wall formed with grooves extending substantially crosswise of the first grooves and communicating at intervals with said first grooves, a facing consisting of a perforated band encircling the periphery of the peripheral wall for covering the second grooves, and a retaining-band extending substantially crosswise of the second grooves for securing the facing in position, substantially as and for the purpose set forth.

17. The combination of a filtering-body formed with a tubular wall having its inner face provided with annular grooves and its periphery formed with lengthwise grooves communicating at intervals with the annular grooves, a facing consisting of a perforated band encircling the periphery of the tubular wall for covering the grooves in said periphery, and a retaining-band wound spirally around the facing and extending substantially crosswise of the second grooves for securing the facing in position, substantially as and for the purpose described.

18. The combination of a filtering-body formed with a tubular wall having its inner face provided with annular grooves communicating with the inner chamber of the filtering-body and its periphery formed with lengthwise grooves communicating at intervals with the annular grooves, said periphery being provided with annular grooves intersecting the lengthwise grooves and formed of less depth than said lengthwise grooves, a facing consisting of a perforated band encircling the periphery of the tubular wall for covering the grooves in said periphery, and a retaining-band extending substantially crosswise of the lengthwise grooves for securing the facing in position, said retaining-band being embedded in the facing, substantially as and for the purpose specified.

In testimony whereof I have hereunto signed my name, in the presence of two attesting witnesses, at Syracuse, in the county of Onondaga, in the State of New York, this 13th day of February, 1897.

GEORGE G. FRYER.

Witnesses:
   E. A. WEISBURG,
   K. H. THEOBALD.